J. BRADLEY & J. NICHOLAS.
Machines for Thrashing and Hulling Clover.
No 5,634.
Reissued Oct. 28, 1873.
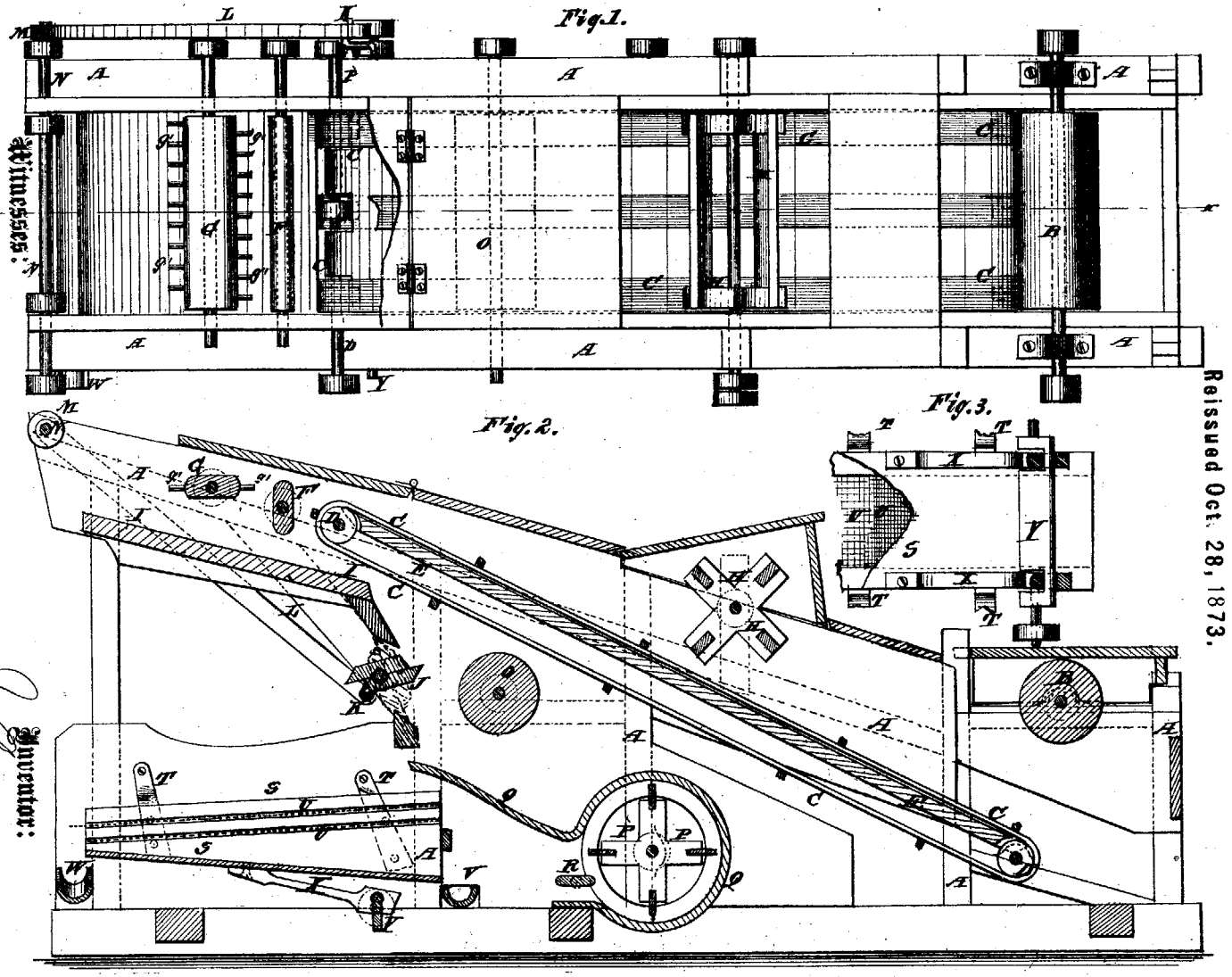
Witnesses:
P. C. Dietrich
C. Sulguier
Inventor:
J. Bradley
J. Nicholas
PER
Attorneys.
AM. PHOTO-LITHOGRAPHIC Co. N.Y. (OSBORNE'S PROCESS)

UNITED STATES PATENT OFFICE.

JAMES BRADLEY AND JAMES NICHOLAS, OF GOMER, OHIO.

IMPROVEMENT IN MACHINES FOR THRASHING AND HULLING CLOVER.

Specification forming part of Letters Patent No. 138,556, dated May 6, 1873; reissue No. 5,634, dated October 28, 1873; application filed August 30, 1873.

*To all whom it may concern:*

Be it known that we, JAMES BRADLEY and JAMES NICHOLAS, of Gomer, in the county of Allen and State of Ohio, have invented certain new and useful Improvements in Combined Thrashing, Grain-Separating, and Clover-Hulling Machines; and we do hereby declare that the following is a full, clear, and exact description thereof, that will enable others skilled in the art to which it appertains to make and use the same, reference being had to the accompanying drawings and to the letters of reference marked thereon, which form a part of this specification.

The nature of our invention relates to an improved thrasher, grain-separator, and clover-huller combined; and it consists in making a portion of the feed-board, which conducts the seed to the hulling-cylinder, oscillating and adjustable, so that it will prevent choking, and may be made to conduct the grain in one direction and the clover-seed in another.

Figure 1 is a plan view of our machine, parts being broken away to show the construction. Fig. 2 is a vertical section taken on the line *x x*, Fig. 1. Fig. 3 is a detail view of the under side of the shoe.

A represents the frame, of any desired construction, having an ordinary thrashing-cylinder, B, hung in one end. From this cylinder the grain or clover passes to the endless carrier C, placed around the inclined table E, and which carries the hay and straw up under the revolving beater H, which knocks out the seed. The hay or straw is taken from the carrier by the pickers F G and transferred to the straw-carrier, which carrier, with the exception of the roller N, is not shown in the drawings. The grain or seed from the upper end of the table E and carrier C, and that knocked out by the pickers F G, falls upon and slides down an inclined table, I, the lower part of the table being made much steeper than the upper. The middle of the lower part of the table is removed, as shown in Fig. 2, and its place supplied by the feed-board J, which is secured to the crank-shaft K in such a manner that it can be turned at right angles to the plane of the table, or so as to form a continuous part of it, and close the opening through it. Attached to the crank on the shaft K is a connecting-rod, L, which has its other end fastened to a crank, M, formed upon the end of the roller-shaft N, for operating the straw-carrier. The two cranks being of unequal size, the revolution of the smaller one, M, will only cause the one K to oscillate, and thus agitate the board, so that no seed will find a lodging-place upon it. In thrashing grain, the rod L is disconnected and the feed-board J is adjusted, as shown by solid lines in Fig. 2, so as to guide the grain to the shoe S. In thrashing clover, the connecting-rod L is connected with the cranks K M, which causes the feed-board J to oscillate and play in such a manner as to conduct the clover-seed and balls into the hulling-cylinder O, the oscillation of the feed-board serving to prevent it from choking. The shoe is provided with the screens U, and is supported by the pivoted bars T, and is caused to vibrate back and forth by the crank Y and connecting-rod X. At each end of the shoe is placed a spout, V W, which catches the grain or seed as it falls from the two ends of the screens. The fan P is inclosed in the casing Q, and has a board, R, placed in front of it, so as to direct the blast in any desired direction.

Having thus described our invention, we claim—

The combination of the crank K, connecting-rod L, and crank M with the feed-board J and the roller of the straw-carrier, substantially as specified.

In testimony that we claim the foregoing we have hereunto set our hands this 25th day of August, 1873.

JAMES BRADLEY.
JAMES NICHOLAS.

Witnesses:
S. SANDERS,
JAMES BELFORD.